(12) United States Patent
Morita et al.

(10) Patent No.: US 10,079,954 B2
(45) Date of Patent: Sep. 18, 2018

(54) DISPLAYING FUNCTIONS OF AN IMAGE FORMING APPARATUS IN ORDER OF PRIORITY

(71) Applicant: Konica Minolta, Inc., Chiyoda-ku, Tokyo (JP)

(72) Inventors: Mitsutaka Morita, Hachioji (JP); Katsutoshi Sawada, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 21 days.

(21) Appl. No.: 15/130,078

(22) Filed: Apr. 15, 2016

(65) Prior Publication Data
US 2016/0352960 A1 Dec. 1, 2016

(30) Foreign Application Priority Data
May 29, 2015 (JP) .................................. 2015-110561

(51) Int. Cl.
*G06F 3/12* (2006.01)
*H04N 1/32* (2006.01)
*H04N 1/00* (2006.01)

(52) U.S. Cl.
CPC ....... *H04N 1/32101* (2013.01); *G06F 3/1204* (2013.01); *G06F 3/1226* (2013.01); *G06F 3/1232* (2013.01); *G06F 3/1292* (2013.01); *H04N 1/00307* (2013.01); *H04N 1/00315* (2013.01); *H04N 1/00344* (2013.01); *H04N 1/00347* (2013.01); *H04N 1/00466* (2013.01); *H04N 1/00482* (2013.01); *H04N 2201/0094* (2013.01)

(58) Field of Classification Search
CPC . H04N 1/32101; G06F 3/1226; G06F 3/1232; G06F 3/1204

USPC ......................................................... 358/1.15
See application file for complete search history.

(56) References Cited

U.S. PATENT DOCUMENTS

| | | | | |
|---|---|---|---|---|
| 2002/0047815 | A1* | 4/2002 | Maeda | H04N 1/00416 345/1.1 |
| 2006/0274347 | A1* | 12/2006 | Mori | G06F 3/1205 358/1.13 |
| 2009/0033982 | A1* | 2/2009 | Hwang | G06F 3/1204 358/1.15 |

FOREIGN PATENT DOCUMENTS

| | | |
|---|---|---|
| JP | 2000-298540 | 10/2000 |
| JP | 2009134332 | 6/2009 |
| JP | 2010-191829 A | 9/2010 |

(Continued)

OTHER PUBLICATIONS

Notification of Reason for Refusal issued in corresponding Japanese Patent Application No. 2015-110561, dated Apr. 25, 2017 with English translation (10 pages).

(Continued)

*Primary Examiner* — Eric A Rust
(74) *Attorney, Agent, or Firm* — Buchanan Ingersoll & Rooney PC

(57) ABSTRACT

Disclosed is an image forming apparatus including: a hardware processor configured to: recognize a plurality of functions of the image forming apparatus, and determine a priority function to be preferentially introduced to a user among the plurality of functions recognized; and a first transmitting unit configured to transmit function introducing information indicating the functions of the image forming apparatus, which are recognized by the hardware processor, and the priority function, to a terminal device.

5 Claims, 20 Drawing Sheets

(56) References Cited

FOREIGN PATENT DOCUMENTS

| JP | 2010268346 | 11/2010 |
|----|------------|---------|
| JP | 2011178079 | 9/2011  |
| JP | 2013207718 | 10/2013 |

OTHER PUBLICATIONS

Office Action (Notice of Reason for Refusal) dated Aug. 1, 2017, by the Japanese Patent Office in corresponding Japanese Patent Application No. 2015-110561, and an English Translation of the Office Action. (7 pages).

* cited by examiner

FIG.12

| MAIN FUNCTION | COMBINATION SETTING | USE FREQUENCY | PRIORITY ORDER |
|---|---|---|---|
| STAPLE | COLOR | 5 | LOW |
| | PUNCH | 0 | LOW |
| | 2-SIDED PRINTING | 7 | HIGH |
| COLOR | STAPLE | 8 | HIGH |
| | PUNCH | 3 | LOW |
| | 2-SIDED PRINTING | 6 | LOW |
| . . . | . . . | . . . | . . . |
| | . . . | . . . | . . . |

DISPLAYING FUNCTIONS OF AN IMAGE FORMING APPARATUS IN ORDER OF PRIORITY

BACKGROUND OF THE INVENTION

Field of the Invention

The present invention relates to an image forming apparatus and a management server for introducing the functions of the image forming apparatus to a terminal device, the terminal device and a non-transitory computer-readable recording medium.

Description of Related Art

An image forming apparatus, such as a printer, a multi function peripheral or the like, is used by connecting to a network in an office or the like. In this environment, a user searches the image forming apparatuses on the same network from his/her terminal device, and selects the destination to which a job is input, among a plurality of searched image forming apparatuses.

As the above search result, the list of the names or the IP addresses of the searched image forming apparatuses is displayed on the screen of the user's terminal device. However, in case of the above list, it is difficult to recognize the image forming apparatus having the function which a user wants to use.

From the above circumstance, for example, in Japanese Patent Application Publication No. 2000-298540, the technology for sorting and indicating the searched image forming apparatuses in accordance with the sorting condition set by a user is disclosed.

Further, it is considered that the function list of each image forming apparatus is displayed in the list of the searched image forming apparatus. However, from the circumstances in which the screen of the terminal device is small, the image forming apparatus has many functions to be displayed, the number of the searched image forming apparatuses is large, and the like, even though the function list is displayed, it is very difficult to view the function list. Therefore, in many cases, the above lists are displayed in phases as follows. Firstly, the list of only the names or the like of the searched image forming apparatuses is displayed. When the selection of one image forming apparatus is received from a user, the function list of the selected image forming apparatus is displayed.

In the function list, because the functions are generally listed in the predetermined order, even though the image forming apparatus to be displayed is changed, the function list in which the similar contents are listed in the same order is displayed. Therefore, it is not easy for a user to grasp the difference in the functions between the image forming apparatuses.

Further, in the technology disclosed in Japanese Patent Application Publication No. 2000-298540, because it is necessary to set the sorting condition and the like by a user, the troublesome task is caused. Further, in case that a user does not previously know the functions of each image forming apparatus, the user cannot set the sorting condition. For example, even though an image forming apparatus having a special function is provided on the network, it is difficult for a user who does not know the existence of the special function to use the special function by searching the image forming apparatus.

SUMMARY

To achieve at least one of the abovementioned objects, an image forming apparatus reflecting one aspect of the present invention, comprises:

a hardware processor configured to:
recognize a plurality of functions of the image forming apparatus, and
determine a priority function to be preferentially introduced to a user among the plurality of functions recognized; and
a first transmitting unit configured to transmit function introducing information indicating the functions of the image forming apparatus, which are recognized by the hardware processor, and the priority function, to a terminal device.

Preferably, the hardware processor obtains another apparatus capability information indicating functions of another image forming apparatus which is connected to a network to which the image forming apparatus is connected,
wherein the hardware processor determines a function which the image forming apparatus has but the another image forming apparatus does not have, as the priority function by comparing the functions of the image forming apparatus, which are recognized, with the functions indicated in the another apparatus capability information obtained.

Preferably, the hardware processor obtains the another apparatus capability information from only the another image forming apparatus which has a predetermined relation with the image forming apparatus.

Preferably, the predetermined relation is at least any one of a relation in which a manufacturer of the image forming apparatus is same as the manufacturer of the another image forming apparatus, a relation in which a difference in Internet Protocol addresses between the image forming apparatus and the another image forming apparatus is within a predetermined range, and a relation in which the image forming apparatus has a special function which is same as the special function of the another image forming apparatus.

Preferably, the hardware processor counts a use frequency of each function, and
wherein the hardware processor determines the priority function in accordance with the use frequency counted.

Preferably, the image forming apparatus further comprises:
a use history storing unit configured to store a history in which a plurality of functions are combined and used,
wherein the hardware processor prepares related function information indicating a relation between the plurality of functions which are combined and used, in accordance with the history, and
the first transmitting unit further transmits the related function information to the terminal device.

Preferably, the hardware processor assigns a priority order to be introduced to a user, to each function recognized, and the first transmitting unit includes the priority order in the function introducing information.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 12 is a view showing the list including the history in which a plurality of functions are combined and used, and the related function information;

DETAILED DESCRIPTION OF PREFERRED EMBODIMENTS

Hereinafter, preferred embodiments of the present invention will be explained with reference to the accompanying drawings.

Figure 1:
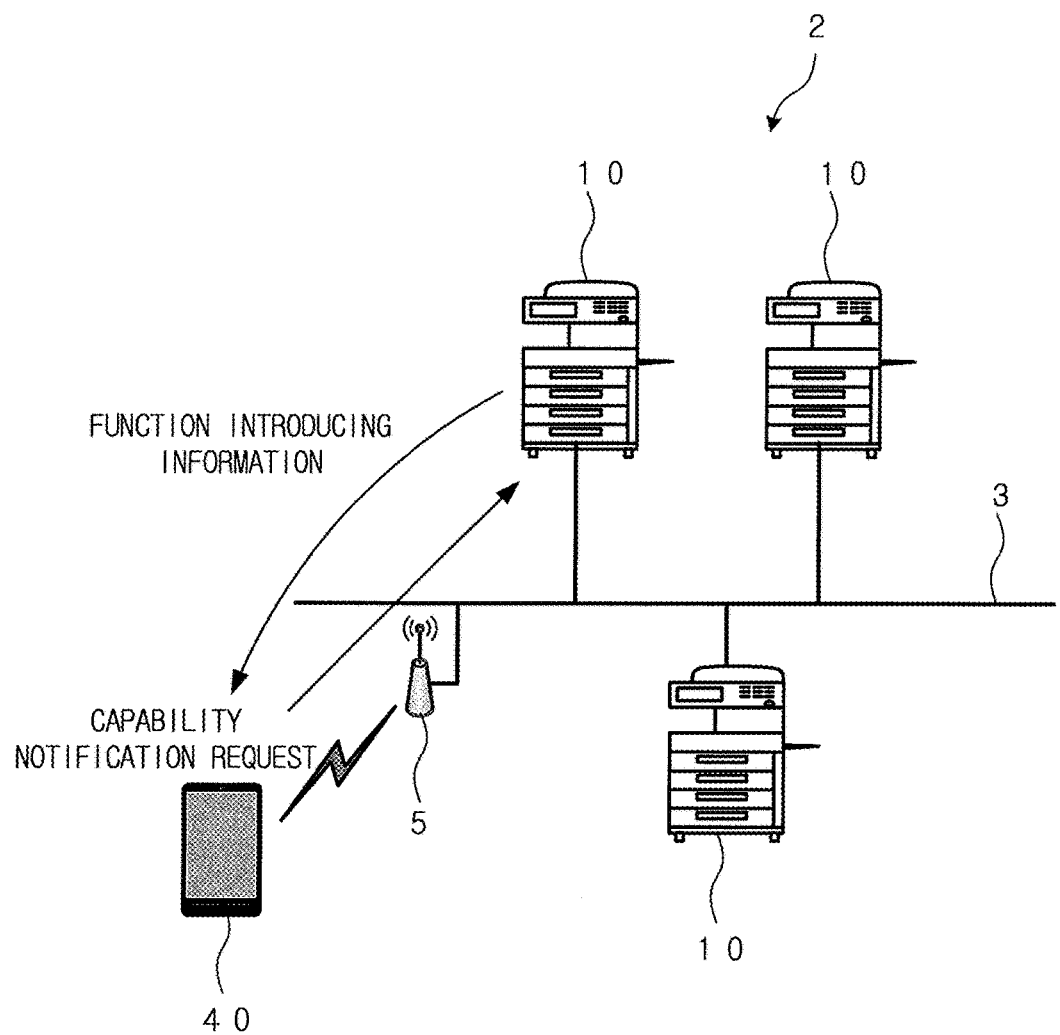
FIG. 1 is a view showing a configuration example of the print system according to the first embodiment.

FIG. 1 shows the configuration example of the print system 2 according to the first embodiment. The print system 2 comprises a plurality of image forming apparatuses 10 which are connected to a network 3, such as a LAN (Local Area Network), a portable terminal 40 which is a terminal device connected to the network 3 by the wireless communication via an access point 5, and the like.

The image forming apparatus 10 is a so-called multi function peripheral which has a copy function for printing an image of an original on a recording sheet by optically reading the original, a scan function for storing the image data of the read original as a file or transmitting the file to an external terminal via the network 3, a print function for printing out a document or an image on a recording sheet in accordance with the print data received from the portable terminal 40, and the like. Hereinafter, the image forming apparatus 10 is also referred to as MFP.

In the print system 2, the portable terminal 40 has a function for searching a plurality of image forming apparatuses 10 provided on the network 3 and for displaying the list thereof before a user transmits a print job to the image forming apparatus 10, and a function for displaying the list of the functions of the image forming apparatus 10 selected by a user from the list of the image forming apparatuses 10.

In this embodiment, the portable terminal 40 transmits the capability notification request to the image forming apparatus 10 selected from the list. The image forming apparatus 10 receiving the above request transmits the function introducing information indicating its own functions to the portable terminal 40. The function introducing information indicates each function of the image forming apparatus 10 and the priority function which is the function to be preferentially introduced to the user among the functions of the image forming apparatus 10. The portable terminal 40 displays the list of the functions of the image forming apparatus 10 in accordance with the received function introducing information.

Figure 2:
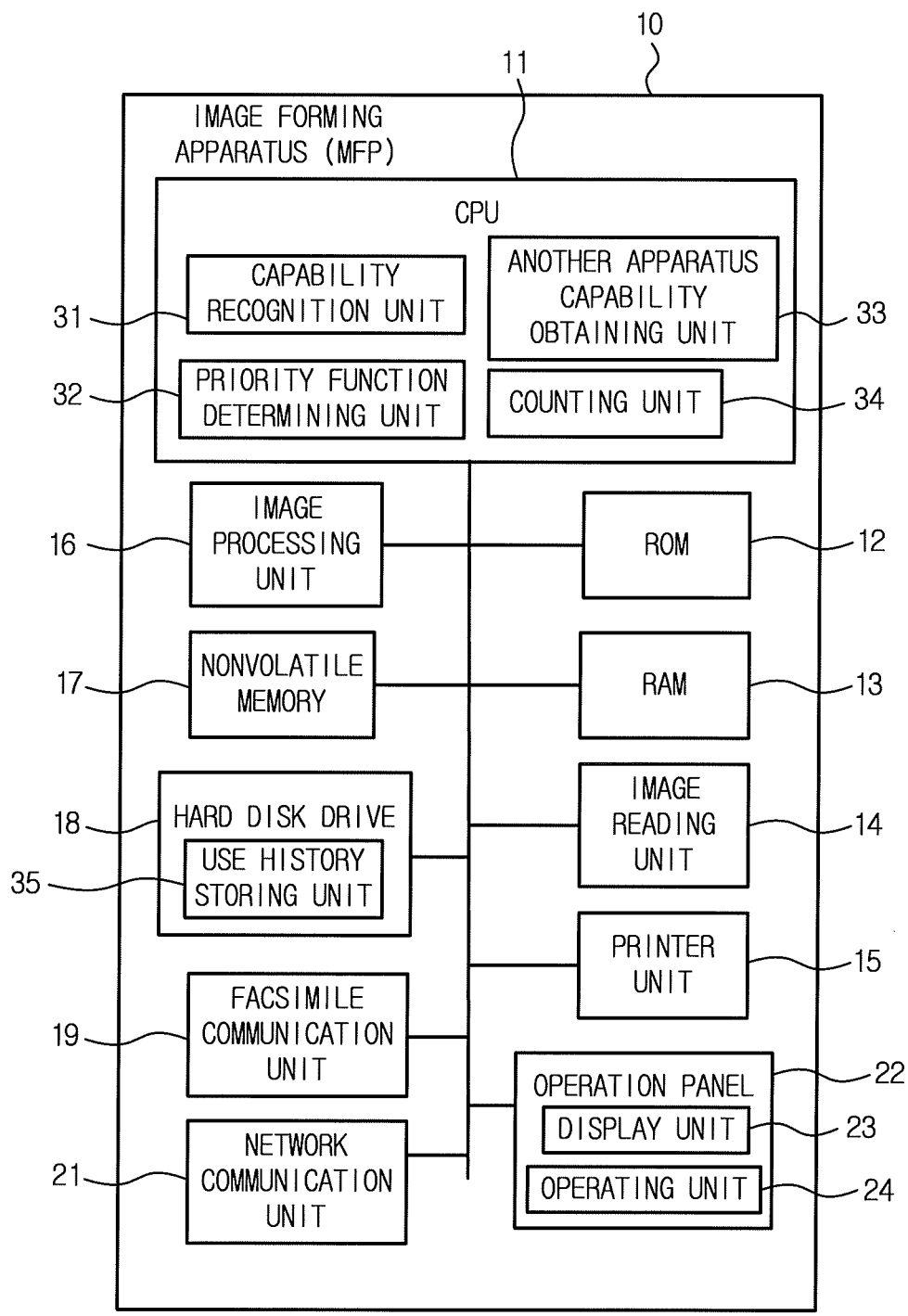
FIG. 2 is a block diagram showing a schematic configuration of the image forming apparatus according to the first embodiment.

FIG. 2 is a block diagram showing the schematic configuration of the image forming apparatus 10. The image forming apparatus 10 comprises a CPU (Central Processing Unit) 11 for entirely controlling the operation of the image forming apparatus 10. The CPU 11 is connected with a ROM (Read Only Memory) 12, a RAM (Random Access Memory) 13, an image reading unit 14, a printer unit 15, an image processing unit 16, a nonvolatile memory 17, a hard disk drive 18, a facsimile communication unit 19, a network communication unit 21, an operation panel 22 and the like via a bus.

By the CPU 11, a middleware, application programs and the like are executed on an OS (Operating System) program as a base. In the ROM 12, various types of programs are stored. By executing various types of processes by the CPU 11 in accordance with these programs, each function of the image forming apparatus 10 is realized.

The RAM 13 is used as a work memory for temporarily storing various data when the CPU 11 executes the process in accordance with the programs and as an image memory for storing image data.

The image reading unit 14 has the function for obtaining the image data by optically reading an original. For example, the image reading unit 14 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 15 has the function for forming an image on the recording sheet in accordance with the image data. In this embodiment, the printer unit 15 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The image processing unit 16 carries out the rasterization processing for converting print data into image data, the compression/decompression processing for image data and the like, in addition to the processings, such as enlargement/reduction and rotation of the image.

The nonvolatile memory 17 is a memory (flash memory) in which the stored contents are not damaged even if the image forming apparatus 10 is turned off, and is used for storing various setting information, and the like.

The hard disk drive 18 is a large-capacity nonvolatile storing device. In the hard disk drive 18, various types of programs, the received print job (print data) and the like are stored. Further, the hard disk drive 18 has the function as the use history storing unit 35 for storing the use frequency of each function of the image forming apparatus 10 and the use frequency of the function related to the main function.

The facsimile communication unit 19 has the function for transmitting and receiving the image data to/from an external device having the facsimile function via a telephone line.

The network communication unit 21 has the function for communicating data with the portable terminal 40 or other external devices via the network 3. The network communication unit 21 functions as the first transmitting unit for transmitting the function introducing information and the like to the portable terminal 30.

The operation panel 22 comprises a display unit 23 and an operating unit 24. The display unit 23 comprises a liquid crystal display (LCD) and the like, and has a function for displaying various types of operation windows, setting windows and the like. The operating unit 24 comprises hardware keys, such as numerical keys, a start button and the like, and a touch panel provided on the physical screen of the display unit 23. The touch panel detects the coordinate position on which the physical screen of the display unit 23 is contacted by a touch pen, the user's finger or the like.

With respect to the function for preparing the function introducing information and for transmitting the function introducing information to the portable terminal 40, the CPU 11 of the image forming apparatus 10 has the function as the capability recognition unit 31, the priority function determining unit 32, the another apparatus capability obtaining unit 33, a counting unit 34 and the like.

The capability recognition unit 31 recognizes the functions of the image forming apparatus 10 which comprises the above capability recognition unit 31 (hereinafter, also referred to as "home apparatus"). For example, the capability recognition unit 31 detects the option device which is attached to the home apparatus and confirms the functions of the home apparatus. In this embodiment, the function to be confirmed includes the function of which the setting can be changed by a user when the job is input. For example, in case of a print job, each item of the print setting, which can be selected by a user is confirmed. Specifically, the above item includes staple, punch, 2-sided printing/1-sided printing, color/monochrome, Nin1 and the like.

The priority function determining unit 32 has the function for determining the priority function to be preferentially introduced to a user among the functions of the home apparatus. The priority function may be previously set at the shipping or by an administrator. Alternatively, the priority function may be dynamically determined in accordance with the comparison with the functions of another image forming apparatus 10 or the use history of each function in the home apparatus.

The another apparatus capability obtaining unit 33 collects the another apparatus capability information indicating the functions of another image forming apparatus 10 connected to the network 3 to which the home apparatus is connected. The another apparatus capability obtaining unit 33 collects the another apparatus capability information from all of the other image forming apparatuses 10 on the network 3, or collects the another apparatus capability information from only the image forming apparatuses 10 having the predetermined relation with the home apparatus among the other image forming apparatuses 10 connected to the network 3. For example, the predetermined relation includes the following relations (1) to (3) and the like. (1) The manufacturer of the home apparatus is the same as that of another image forming apparatus 10. (2) The difference in the IP addresses between the home apparatus and another image forming apparatus 10 is within the predetermined range (for example, the difference in the value of the low-order 8 bits is within the range 0 to 64 or the like). (3) Another image forming apparatus 10 has the special function which is the same as that of the home apparatus.

The counting unit 34 counts the use frequency of each function of the home apparatus. The use frequency obtained by the counting unit 34 is stored in the use history storing unit 35 of the hard disk drive 18. In the use history storing unit 35, the use history in which a plurality of functions are combined and used is stored. For example, the number of times the function of 2-side printing is selected after the function of the staple is selected is stored as the use history in which the staple function and the 2-side printing function are combined and used.

Figure 3:
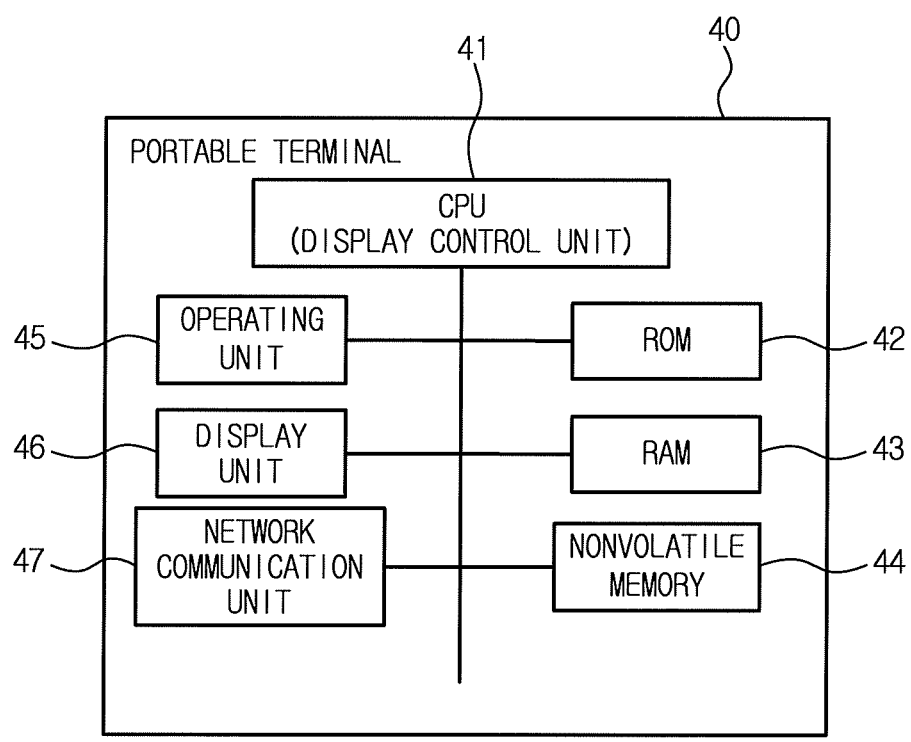
FIG. 3 is a block diagram showing a schematic configuration of the portable terminal.

FIG. 3 is a block diagram showing the schematic configuration of the portable terminal 40. The portable terminal 40 comprises a CPU 41 for entirely controlling the operation of the portable terminal 40. The CPU 41 is connected with a ROM 42, a RAM 43, a nonvolatile memory 44, an operating unit 45, a display unit 46, a network communication unit 47 and the like via a bus.

By the CPU 41, a middleware, application programs and the like are executed on an OS program as a base. In the ROM 42, various types of programs are stored. By executing various types of processes by the CPU 41 in accordance with these programs, each function of the portable terminal 40 is realized.

The RAM 43 is used as a work memory for temporarily storing various data when the CPU 41 executes the process in accordance with the programs.

The nonvolatile memory 44 is a memory (flash memory) in which the stored contents are not damaged even if the portable terminal 40 is turned off, and is used for storing application programs, various types of fixed data, various setting information and the like.

The display unit 46 comprises a liquid crystal display and the like, and has a function for displaying various types of operation windows, setting windows and the like. The operating unit 45 comprises some hardware keys and a touch panel provided on the physical screen of the display unit 46.

The network communication unit 47 has the function for communicating data with the image forming apparatus 10 or other external devices via the network 3. The network communication unit 47 functions as the receiving unit for receiving the function introducing information and the like from the image forming apparatus 10 and the like.

The CPU 41 of the portable terminal 40 has the function as the display control unit for displaying the list of the functions of the image forming apparatus 10 in accordance with the function introducing information received from the image forming apparatus 10.

Figure 4:
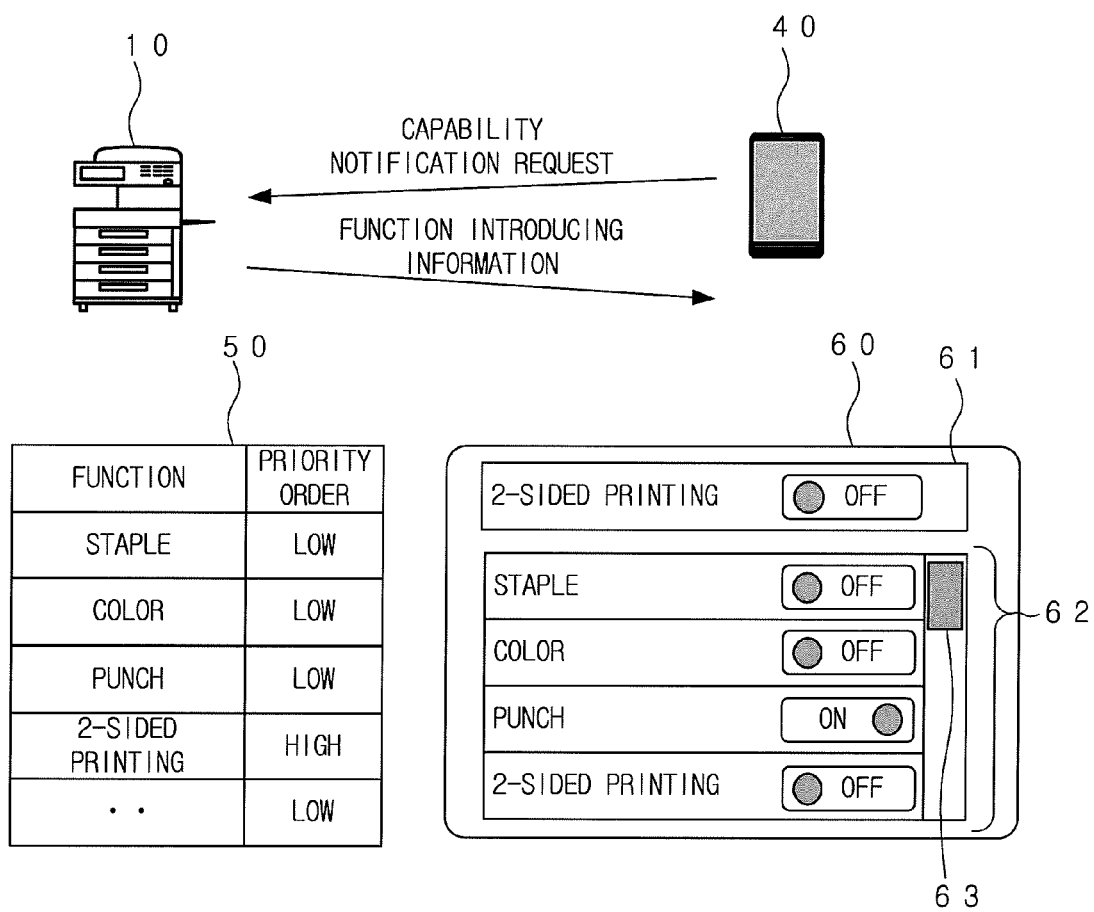
FIG. 4 is a view showing an example of the function introducing information and the function list of the first image forming apparatus.

FIG. 4 shows an example of the function introducing information 50 transmitted from the first image forming apparatus 10 to the portable terminal 40, and the function list 60 displayed on the portable terminal 40 which receives the function introducing information 50. The portable terminal 40 transmits the capability notification request to the first image forming apparatus 10. The first image forming apparatus 10 which receives the above request prepares the function introducing information 50 indicating the functions of the first image forming apparatus 10 and the priority function which is the function to be preferentially introduced to the user among the functions of the first image forming apparatus 10, and transmits the function introducing information 50 to the portable terminal 40. The portable terminal 40 displays the function list 60 of the first image forming apparatus 10 in accordance with the received function introducing information.

The function introducing information 50 includes the name of each function of the first image forming apparatus 10 and the priority order of each function. In this example, the priority order is set to "low" or "high". The priority function is the function having the priory order of "high". In the first image forming apparatus 10, 2-sided printing is the priority function.

The function "staple" is the function for binding the sheets by the staple. The function "color" is the function for printing an image in full color. The function "punch" is the function for punching the sheet. The function "2-sided printing" is the function for printing images on both of the front surface and the rear surface of the sheet, that is, indicates the 2-sided printing function.

The portable terminal 40 displays the function list 60 in which the functions of the first image forming apparatus 10 are listed in accordance with the function introducing information 50 received from the first image forming apparatus 10. In the function list 60, the priority function (the function having the priority order of "high") is preferentially displayed.

Specifically, the function list 60 comprises the upper fixed area 61 and the scroll area 62 which is arranged below the fixed area 61. The priority function is displayed in the fixed area 61. In the scroll area 62, the functions indicated in the function introducing information 50 are arranged in the predetermined fixed order.

In case that all of the functions cannot be displayed in the scroll area 62, it is possible to scroll and change the range displayed in the scroll area 62 by adjusting the scroll bar 63.

In the first image forming apparatus 10, because the priority function is the function "2-sided printing", the function "2-sided printing" is displayed in the fixed area 61.

Figure 5:
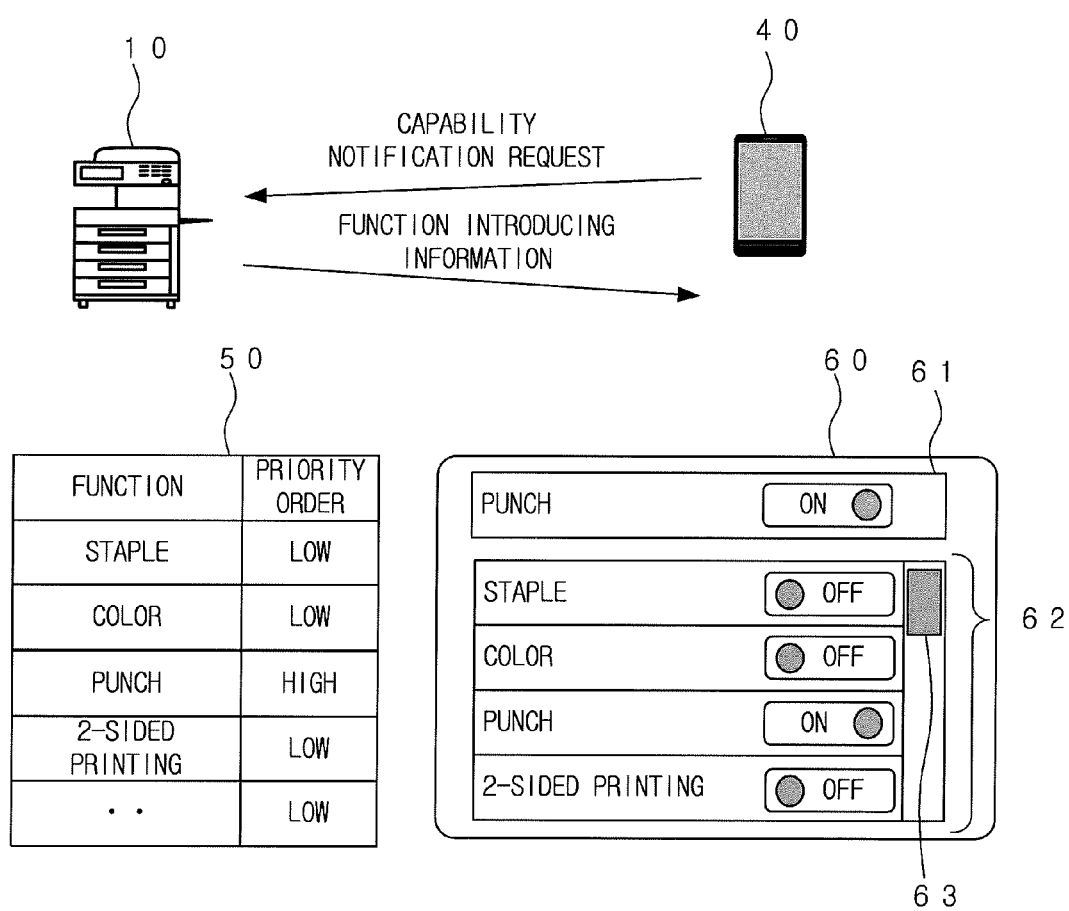
FIG. 5 is a view showing an example of the function introducing information and the function list of the second image forming apparatus.

FIG. 5 shows an example of the function introducing information 50 transmitted from the second image forming apparatus 10 to the portable terminal 40, and the function list 60 displayed on the portable terminal 40 which receives the function introducing information 50. In the second image forming apparatus 10, the function "punch" is the priority function. Therefore, the function "punch" is displayed in the fixed area 61 of the function list 60. The contents displayed in the scroll area 62 are the same as the contents in which the functions of the first image forming apparatus 10 are displayed.

As described above, the image forming apparatus 10 transmits the function introducing information 50 indicating each function of the home apparatus and the priority function to be preferentially introduced to the user, in response to the capability notification request received from the portable terminal 40. The portable terminal 40 which receives the function introducing information 50 displays the functions of the image forming apparatus 10 so as to prioritize the priority function (so that the priority function attracts the attention of the user). Therefore, the user can easily recognize the special function of each image forming apparatus 10 and can select the image forming apparatus 10 as the destination to which a job is input.

Further, because the image forming apparatus 10 determines the priority function and notifies the portable terminal 40 of the priority function, even though a user does not know the functions of each image forming apparatus 10, it is possible to easily grasp the feature of each image forming apparatus 10.

Next, the method for determining the priority function will be explained.

The priority function is determined as follows.

(1) The priority function is set at the shipping or by an administrator.

(2) The priority function is determined by comparing the functions of the home apparatus with the functions of another image forming apparatus.

(3) The priority function is determined in accordance with the use frequency of each function.

Each determining method will be explained.

(1) The priority function is set at the shipping or by an administrator.

In this method, for example, the priority function is previously set for each apparatus. Alternatively, an administrator optionally determines the priority function. In case that an administrator determines the priority function, it is preferable to determine the priority function so as not to overlap with the priority function of another image forming apparatus 10 which is provided on the same network.

(2) The priority function is determined by comparing the functions of the home apparatus with the functions of another image forming apparatus.

Figure 6:
FIG. 6 is an explanatory view showing the situation in which the priority function of the home apparatus is determined by comparing the functions of the home apparatus with the functions of another image forming apparatus.

In this method, the image forming apparatus 10 obtains the information relating to the functions of another image forming apparatus 10 which is connected to the same network, and compares the functions of the home apparatus with the functions of another image forming apparatus 10. Then, the image forming apparatus 10 determines the function which the home apparatus has but another image forming apparatus 10 does not have, as the priority function of the home apparatus. For example, in the example shown in FIG. 6, the function "punch" is determined as the priority function.

As described above, the image forming apparatus 10 compares the functions of the home apparatus with the functions of another image forming apparatus 10, and determines the special function of the home apparatus as the priority function of the home apparatus. Therefore, the feature of the function of the home apparatus which is currently connected to the network 3 can be clarified.

The range of the image forming apparatuses 10 to be compared may be limited to the specific range in which the image forming apparatuses have the predetermined relation with the home apparatus. The predetermined relation includes the relations, such as the manufacturer of the home apparatus is the same as that of another image forming apparatus 10, the difference in the IP addresses between the home apparatus and another image forming apparatus is within the predetermined range (for example, the difference in the value of the low-order 8 bits is within the range 0 to 64 or the like), another image forming apparatus 10 has the special function which is the same as that of the home apparatus, and the like.

For example, in case that the predetermined relation is the relation "the manufacturer of the home apparatus is the same as that of another image forming apparatus 10", all of the image forming apparatuses 10 which are connected to the network 3 to which the home apparatus is connected are classified into each manufacturer group. Then, the image forming apparatus 10 compares the functions of only the image forming apparatuses 10 which belong to the same manufacturer group as the home apparatus, with the functions of the home apparatus, and determines the priority function of the home apparatus.

Figure 7:
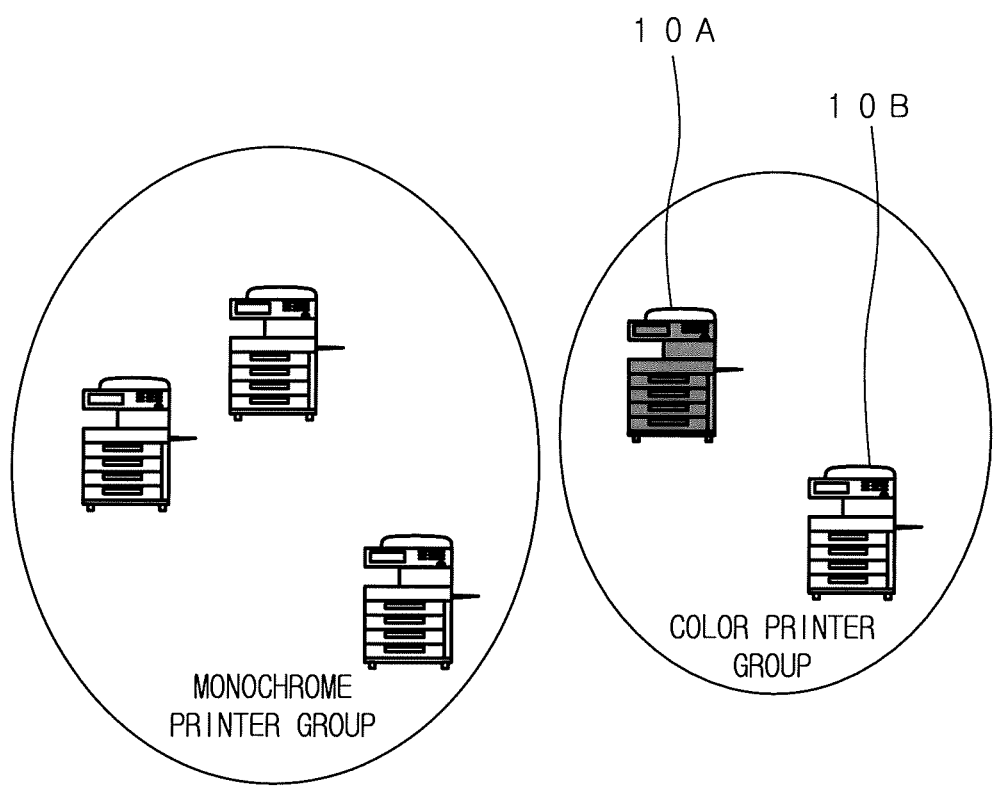
FIG. 7 is a view showing an example in which the image forming apparatuses provided on the network are classified into the color printer group and the monochrome printer group.

FIG. 7 shows an example in which the image forming apparatuses are classified into the color printer group and the monochrome printer group. The home apparatus belongs to the color printer group. In the color printer group, in addition to the home apparatus 10A, the image forming apparatus 10B is included. In this case, the home apparatus 10A compares the functions of the home apparatus 10A with the functions of the other image forming apparatus 10B, and determines the priority function of the home apparatus 10A.

Figure 8:
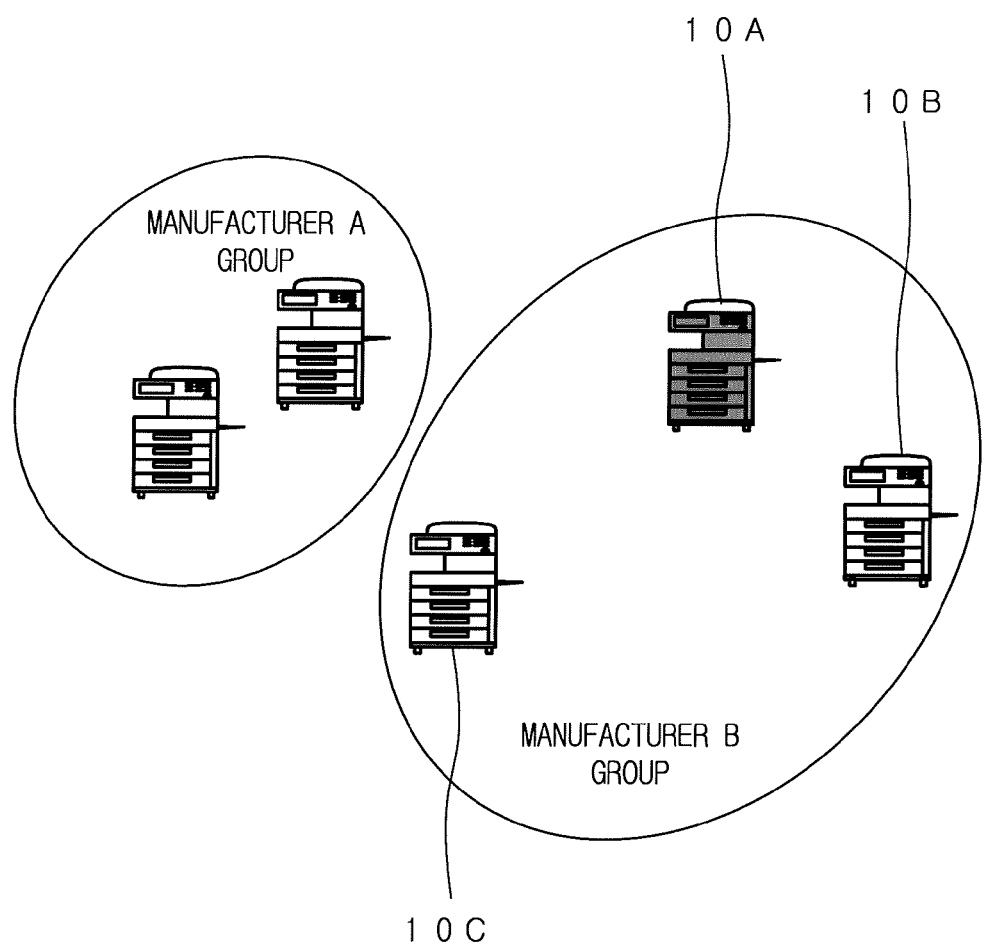
FIG. 8 is a view showing an example in which the image forming apparatuses provided on the network which is the same as that of FIG. 7 are classified into the manufacturer groups.

FIG. 8 shows an example in which the image forming apparatuses 10 which are connected to the network 3 which is the same as that of FIG. 7 are classified into the manufacturer groups. The home apparatus 10A belongs to the manufacturer B group. In the manufacturer B group, in addition to the home apparatus 10A, the image forming apparatuses 10B and 10C are included. In this case, the home apparatus 10A compares the functions of the home apparatus 10A with the functions of another image forming apparatus 10B and the functions of another image forming apparatus 10C, and determines the priority function of the home apparatus 10A.

Figure 9:
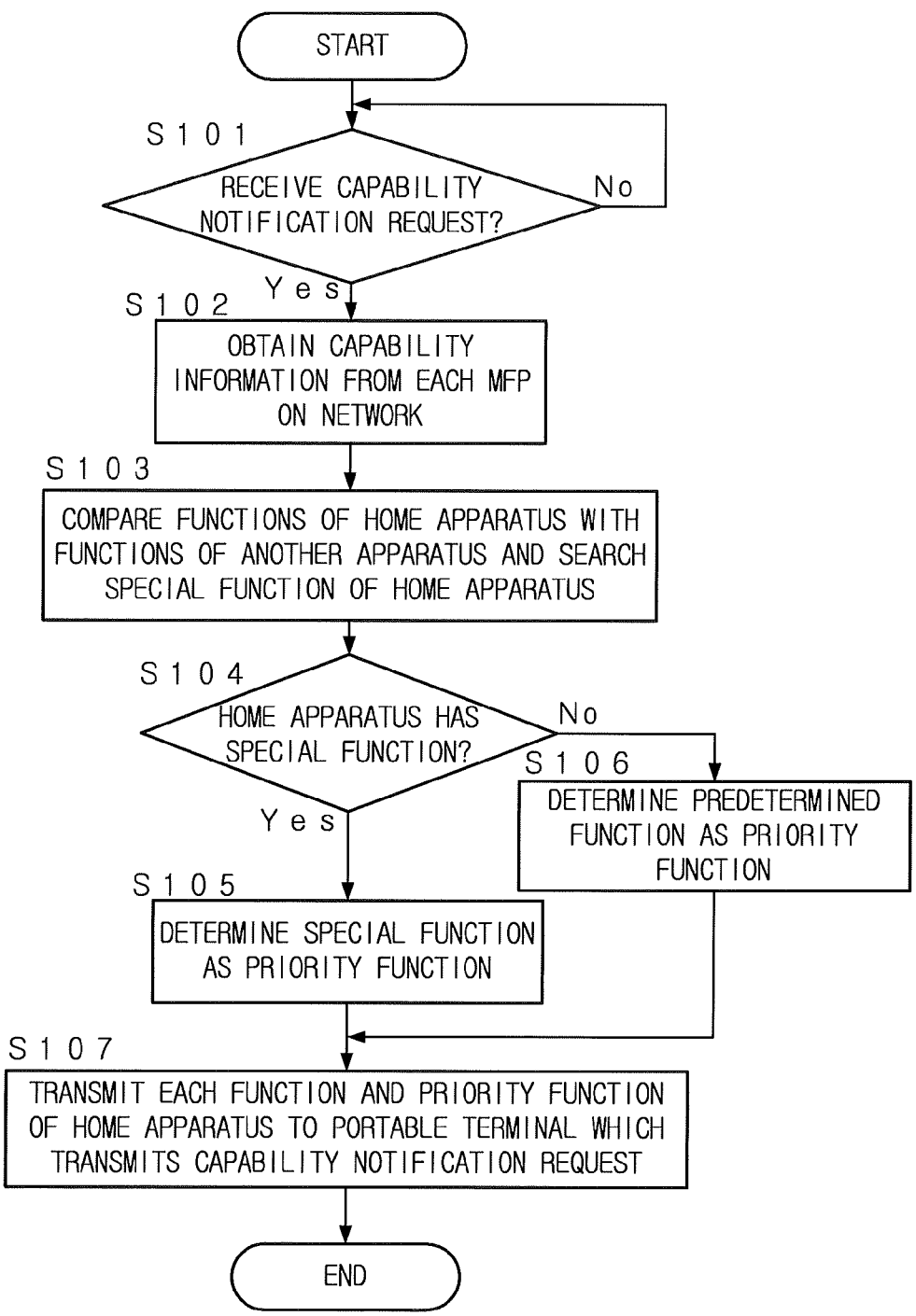
FIG. 9 is a flowchart showing the process executed by the image forming apparatus when the function introducing information is transmitted to the portable terminal.

FIG. 9 is a flowchart showing the process for transmitting the function introducing information 50 to the portable terminal 40 by the image forming apparatus 10 in case that the image forming apparatus 10 compares the functions of the home apparatus with the functions of another image forming apparatus 10 and determines the priority function of the home apparatus. When the capability notification request is received from the portable terminal 40 (Step S101; Yes), the image forming apparatus 10 inquires the functions of each image forming apparatus connected to the network 3 to which the home apparatus is connected and obtains the information relating to the functions of each image forming apparatus 10 (another apparatus capability information) (Step S102).

The image forming apparatus 10 compares the functions of the home apparatus with the functions of another image forming apparatus 10, and searches the function which the home apparatus has but another image forming apparatus does not have (the special function of the home apparatus) (Step S103).

When the image forming apparatus 10 has the special function (Step S104; Yes), the image forming apparatus 10 determines the above special function as the priority function of the home apparatus (Step S105). Then, the image forming apparatus 10 prepares the function introducing information 50 indicating each function and the priority function of the home apparatus, and transmits the function introducing information 50 to the portable terminal 40 which transmits the capability notification request received in Step S101 (Step S107). The process is ended.

In case that the image forming apparatus 10 does not have the special function (Step S104; No), the image forming apparatus 10 determines the predetermined function (for example, the function which is set at the shipping or by an administrator as described above) as the priority function of the home apparatus (Step S106). Then, the process proceeds to Step S107.

(3) The priority function is determined in accordance with the use frequency of each function.

In this method, the image forming apparatus 10 counts the use frequency of each function of the home apparatus, and determines the priority function in accordance with the use frequency. In this case, the function having the lowest use frequency is determined as the priority function. It is thought that a user does not know that the function having the low use frequency is provided in the image forming apparatus 10. Therefore, by determining such a function as the priority function, the above function is preferentially introduced to the user and the user is prompted to use the above function.

When the image forming apparatus 10 receives the capability notification request from the portable terminal 40, the image forming apparatus 10 checks the use frequency of each function and determines the function having the lowest use frequency at this time as the priority function. In case that there are a plurality of functions having the lowest use frequency, the image forming apparatus 10 determines the function which is randomly selected from the functions having the lowest use frequency, as the priority function. Because the priority function is changed every when the capability notification request is received, the priority function can be uniformly introduced to the user.

Figure 10:
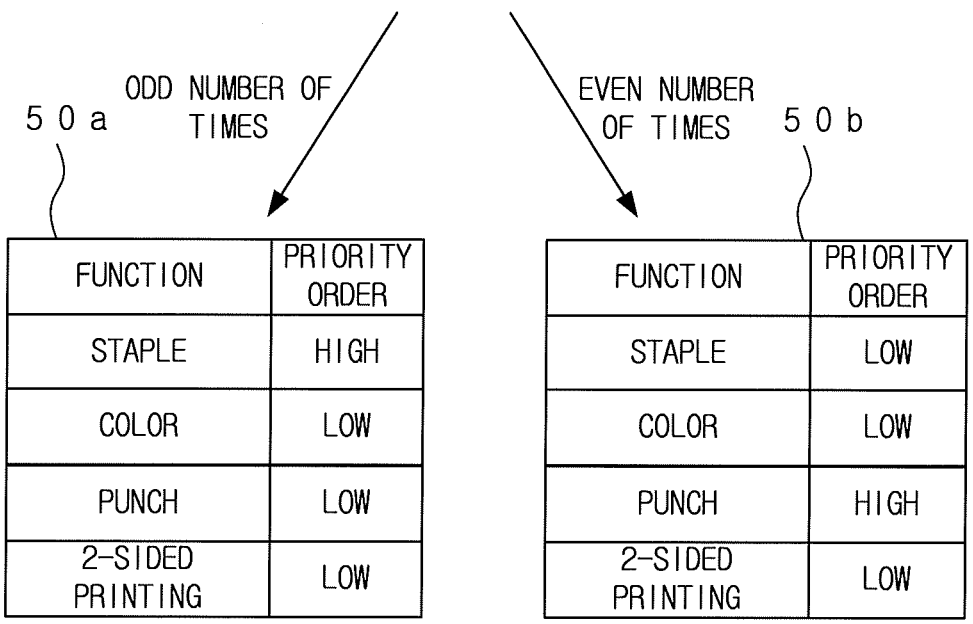
FIG. 10 is a view showing an example in which the priority function is determined in accordance with the use frequency.

In the example shown in FIG. 10, the use frequency of the function "staple" and the use frequency of the function "punch" are "0". For example, in this case, when the image forming apparatus 10 receives the capability notification request the odd number of times, the image forming apparatus 10 prepares the function introducing information 50a in which the function "staple" is set to the priority function, and transmits the function introducing information 50a to the portable terminal 40. When the image forming apparatus 10 receives the capability notification request the even number of times, the image forming apparatus 10 prepares the function introducing information 50b in which the function "punch" is set to the priority function, and transmits the function introducing information 50b to the portable terminal 40.

Figure 11:
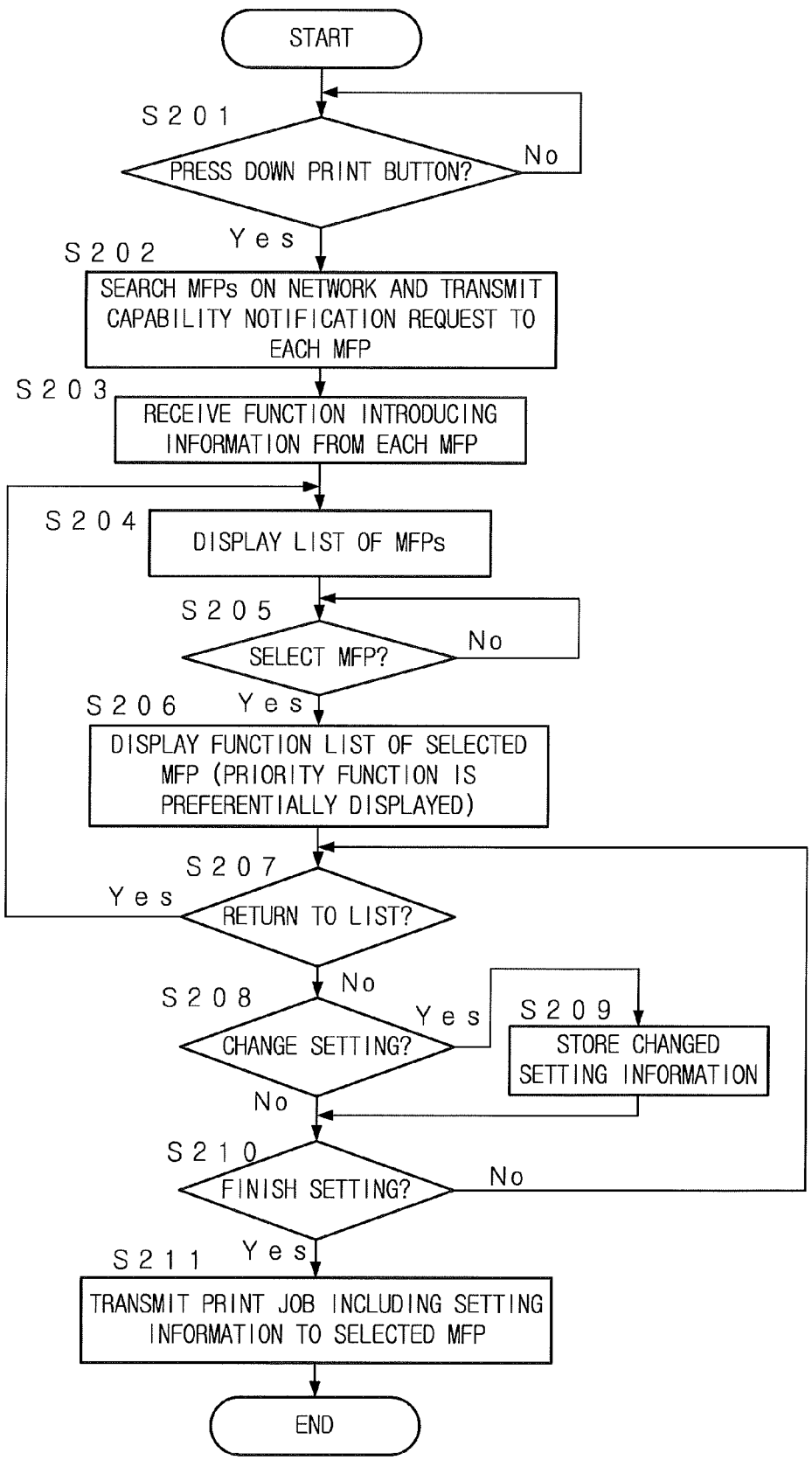
FIG. 11 is a flowchart showing the operation for displaying the function list in accordance with the function introducing information received by the portable terminal from the image forming apparatus.

FIG. 11 shows the process for displaying the function list 60 by the portable terminal 40. In this drawing, the case in which the print job is transmitted from the portable terminal 40 to the image forming apparatus 10, will be explained.

In the portable terminal 40, after the file to be printed is selected, by pressing down the print button (Step S201; Yes), the portable terminal 40 searches the image forming apparatuses 10 provided on the network 3 to which the portable terminal 40 is connected, and transmits the capability notification request to each of the searched image forming apparatuses 10 (Step S202).

Then, the portable terminal 40 receives the function introducing information 50 from each image forming apparatus 10 (Step S203). The portable terminal 40 displays the list of the searched image forming apparatuses 10 (Step S204), and waits for the user's selection of the image forming apparatus 10 from the list (Step S205; No).

When one the image forming apparatus 10 is selected from the list (Step S205; Yes), the portable terminal 40 displays the function list 60 of the selected image forming apparatus 10 in accordance with the function introducing information 50 received from the selected image forming apparatus 10 (Step S206). In the function list 60, the portable terminal 40 preferentially displays the priority function indicated in the function introducing information 50.

In case that the operation for returning to the list of the searched image forming apparatuses 10 is received (Step S207; Yes), the process returns to Step S204.

When the setting change, such as the operation for switching on/off any one of the functions, and the like, is received in the situation in which the function list 60 is displayed (Step S208; Yes), the setting information relating to the changed setting is stored (Step S209), and the process proceeds to Step S210. In case that the setting change is not received (Step S208; No), the process proceeds to Step S210.

In Step S210, it is judged whether the operation for finishing the setting is received. In case that the operation for finishing the setting is not received (Step S210; No), the process returns to Step S207 and is continued. When the operation for finishing the setting is received (Step S210; Yes), the portable terminal 40 prepares the print job including the setting information stored in Step S209, and transmits the prepared print job to the image forming apparatus 10 selected in Step S205 (Step S211). Then, the process is ended.

Next, the case in which the function to be preferentially displayed is changed in accordance with the history in which a plurality of functions are combined and used, will be explained.

The image forming apparatus 10 stores the history in which a plurality of functions are combined and used. Then, the CPU 11 of the image forming apparatus 10 prepares the related function information indicating the relation between a plurality of combined and used functions in accordance with the above history, and transmits the related function information and the function introducing information to the portable terminal 40.

The portable terminal 40 displays the function list on the display unit 46 in accordance with the received function introducing information so as to preferentially display the priority function. Then, in case that when any one of the functions is selected, the selected function is included in the related function information, the function used by being combined with the selected function is preferentially displayed in the function list instead of the priority function.

FIG. 12 is a view showing the situation in which the history in which a plurality of functions are combined and used, and the related function information prepared in accordance with the above history are displayed. As the history in which a plurality of functions are combined and used, the number of times the combination of the main function and the function which is selected after the main function is set is used (the use frequency of the combination) is stored for each combination. In FIG. 12, for example, the following history is stored. The number of times the function "color" is set after the function "staple" is set (the use frequency) is 5. The number of times the function "punch" is set after the function "staple" is set is 0. The number of times the function "2-side printing" is set after the function "staple" is set is 7.

The CPU 11 of the image forming apparatus 10 prepares the related function information from the above use history. The related function information is the information indicating the main function and the related function which is related to the main function. In case of FIG. 12, the function which is selected the most frequently after the main function is selected is determined as the related function which is related to the main function.

For example, because the function which is selected the most frequently after the function "staple" is selected is the function "2-sided printing", in case that the main function is the function "staple", the related function is set to the function "2-sided printing". Similarly, in case that the main function is set to the function "color", the related function is set to the function "staple". In FIG. 12, the related function which is related to each main function is indicated by setting the priority order to "high".

Figure 13A:
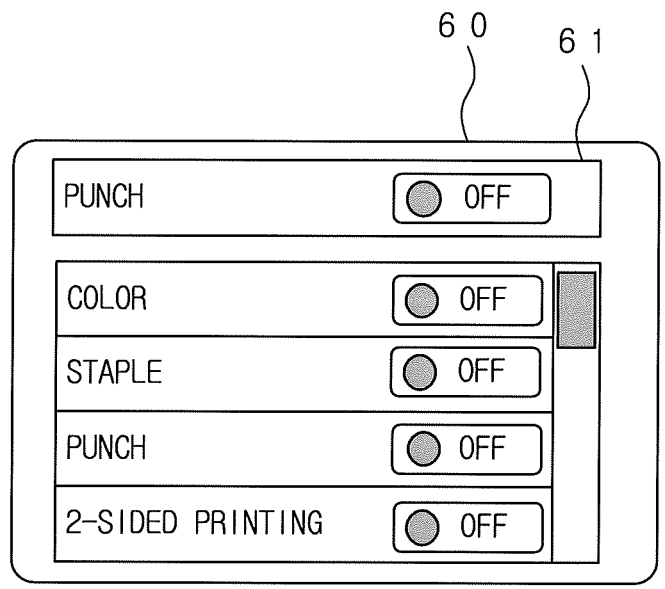
FIGS. 13A and 13B are views showing an example in which the portable terminal changes the displayed function list in accordance with the related function information.
Figure 13B:
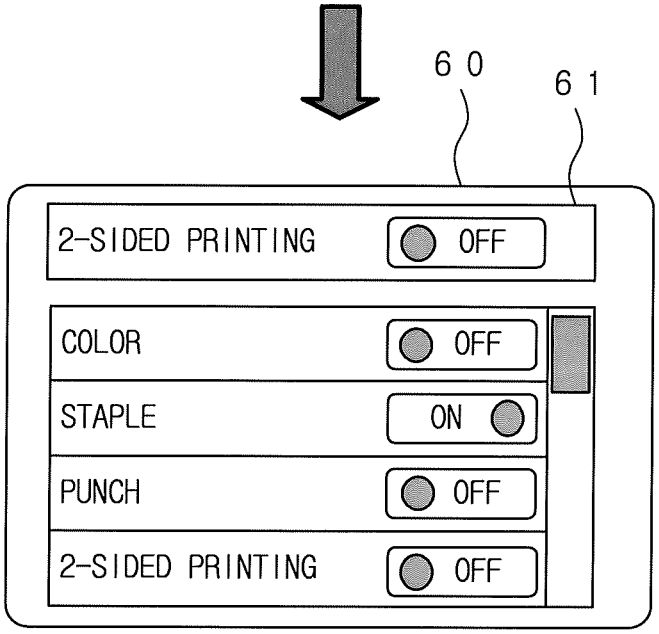

FIGS. 13A and 13B show an example in which the portable terminal 40 changes the displayed function list 60 in accordance with the related function information received from the image forming apparatus 10. In the drawings, the priority function indicated in the function introducing information is the function "punch". Further, the related function information is the information shown in FIG. 12.

FIG. 13A shows the function list 60 displayed in accordance with the function introducing information. The function "punch" which is the priority function is displayed in the fixed area 61. As a result, the function "punch" is preferentially displayed. When a user switches on the function "staple" in this situation, the related function which is determined in case that the function "staple" is set to the main function is preferentially displayed instead of the current priority function. In FIG. 13B, the function "2-sided printing" which is the related function related to the function "staple" is displayed in the fixed area 61, and the function "2-sided printing" is preferentially displayed.

As described above, in case that one function is selected, the function which is used frequently by being combined with the selected function is preferentially displayed in the function list. Therefore, it is possible to assist the user's operation and to improve the convenience for the operation.

Next, the case in which the priority order is attached to each function will be explained.

The image forming apparatus 10 attaches the priority order to each function of the image forming apparatus 10. The function having the highest priority order is the above-described priority function.

Figure 14:
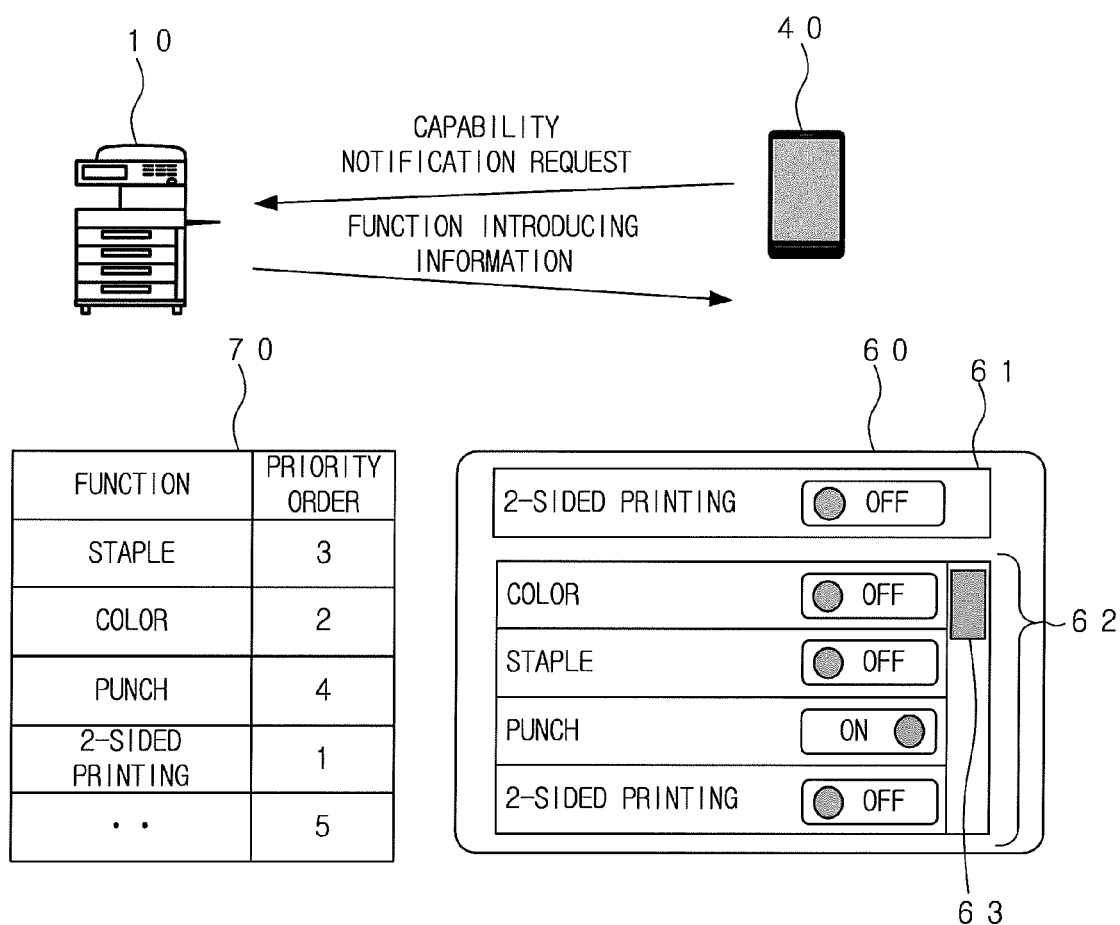
FIG. 14 is a view showing an example of the function introducing information in which the priority order is attached to each function, and the function list displayed on the portable terminal in accordance with the function introducing information.

FIG. 14 shows an example of the function introducing information 70 in which the priority order is attached to each function, and the function list 60 displayed on the portable terminal 40 in accordance with the function introducing information 70. In the function introducing information 70, the priority order is indicated at multiple levels by using the numerals, such as 1, 2, 3 and the like. In this case, the priority order "1" is the highest priority order.

In FIG. 14, the portable terminal 40 displays the function having the priority order "1" in the fixed area 61. In the scroll area 62, the functions are arranged in the predetermined order regardless of the priority order. Even though the scroll area 62 is scrolled, the fixed area 61 is not changed.

Figure 15:
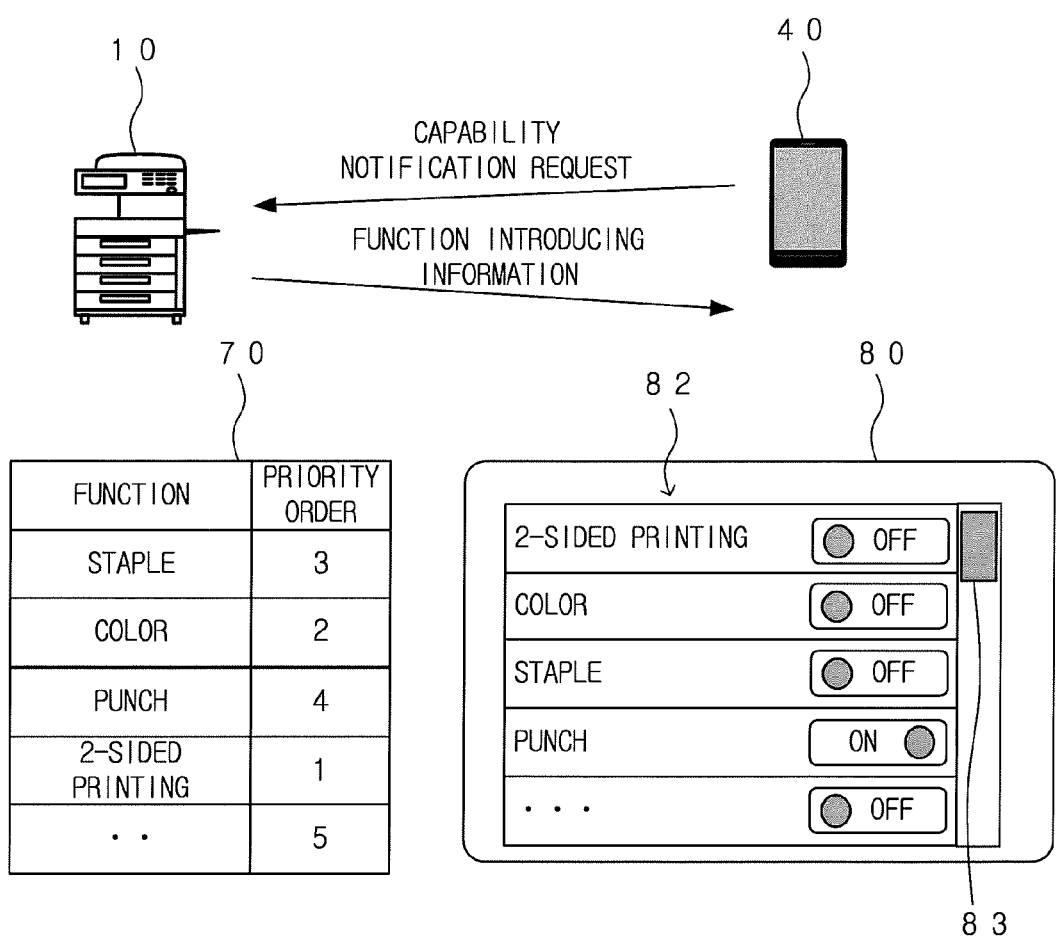
FIG. 15 is a view showing another example of the function introducing information in which the priority order is attached to each function, and the function list displayed on the portable terminal in accordance with the function introducing information.

FIG. 15 shows another type of the function list 80. In the function list 80, the fixed area is not included, and the whole area is the scroll area 82. In the scroll area 82, each function indicated in the function introducing information 70 is displayed so as to arrange the functions in the priority order. Because the scroll bar 83 can be adjusted, the scroll area 82 can be scrolled in the up and down direction.

Next, an example in which the priority function is changed by the portable terminal 40 in case that the priority function of one image forming apparatus 10 is the same as that of another image forming apparatus 10, will be shown.

The portable terminal 40 compares the function introducing information 50 received from one image forming apparatus 10 with the function introducing information 50 received from another image forming apparatus 10 in Step S203 of FIG. 11. In case that the same function is set to the priority function in a plurality of image forming apparatuses 10, the function to be preferentially displayed is changed so as not to overlap the functions to be preferentially displayed in a plurality of image forming apparatuses 10.

Figure 16:
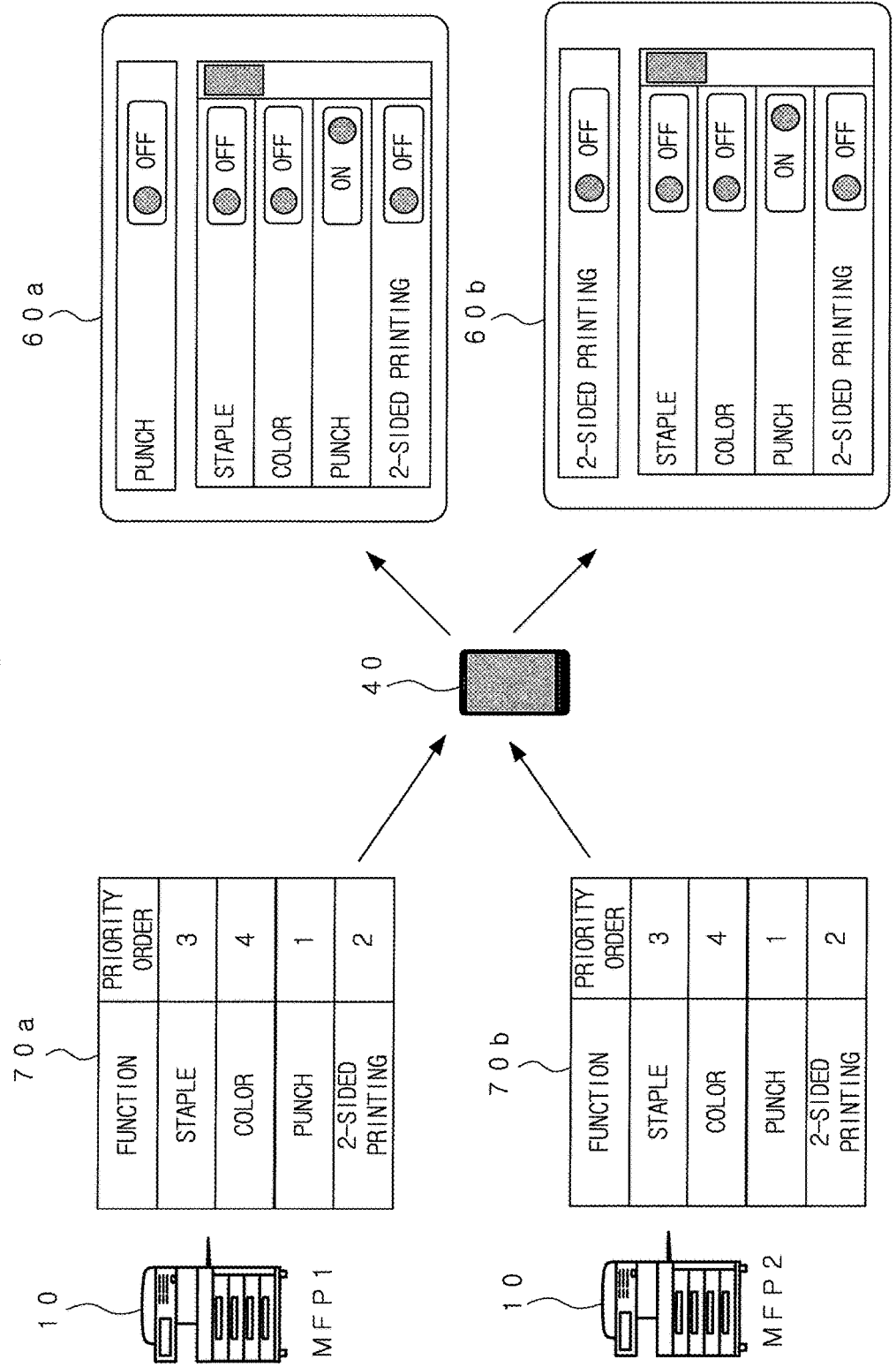
FIG. 16 is a view showing an example in which the portable terminal changes the function to be preferentially displayed in the function list in case that the priority function of one image forming apparatus is the same as that of another image forming apparatus.

For example, in the example shown in FIG. 16, both of the priority function (the function having the priority order "1") indicated in the function introducing information 70a received from the first image forming apparatus 10 (MFP1) and the priority function (the function having the priority order "1") indicated in the function introducing information 70b received from the second image forming apparatus 10 (MFP2) are the function "punch". Therefore, when the portable terminal 40 displays the functions of the first image forming apparatus 10, the function "punch" is preferentially displayed (See the function list 60a in FIG. 16). When the portable terminal 40 displays the functions of the second image forming apparatus 10, another function (in this example, the function "2-sided printing" having the second highest priority order) is preferentially displayed (See the function list 60b in FIG. 16).

As described above, in case that the priority function indicated in the function introducing information 50 received from one image forming apparatus 10 is overlapped with the priority function indicated in the function introducing information 50 received from another image forming apparatus 10, the portable terminal 40 changes the priority function so as not to overlap the function to be preferentially displayed in one function list with the function to be preferentially displayed in another function list. As a result, in case that the function list of the image forming apparatus 10 to be displayed is changed, the function to be preferentially introduced is changed. In view of the introduced priority function, a user can select the image forming apparatus 10 to which a job is input.

Next, the second embodiment will be explained.

In the first embodiment, in each image forming apparatus 10, the priority function is determined. On the other hand, in the second embodiment, the management server 100 which is connected to the network 3 to which a plurality of image forming apparatuses 10 are connected, determines the priority function of each image forming apparatus 10 and notifies the portable terminal 40 of the determined priority function of each image forming apparatus 10.

Figure 17:
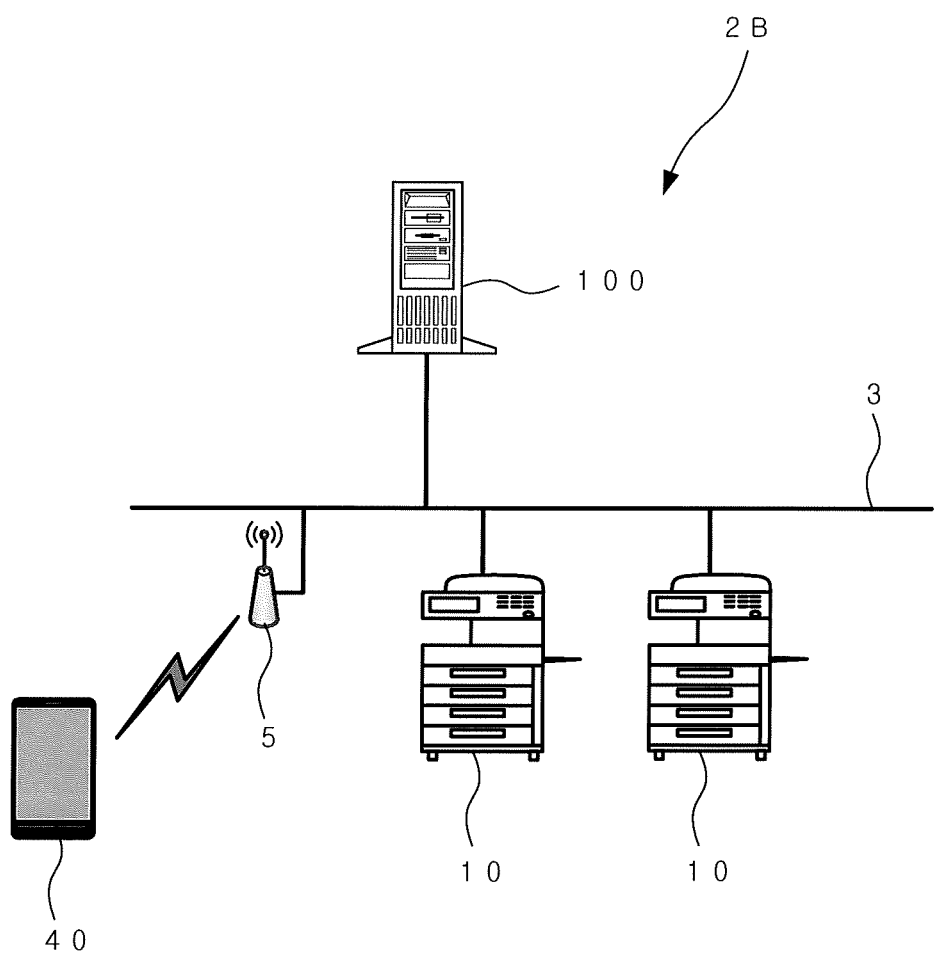
FIG. 17 is a view showing a configuration example of the print system according to the second embodiment.

FIG. 17 shows an example of the print system 2B according to the second embodiment. The print system 2B comprises a plurality of image forming apparatuses 10 which are connected to the network 3, the portable terminal 40 which is connected to the network 3 via the access point 5, and the management server 100 connected to the network 3. It is not necessary that the image forming apparatus 10 according to the second embodiment has the function for determining the priority function and for notifying the portable terminal 40 of the determined priority function.

Figure 18:
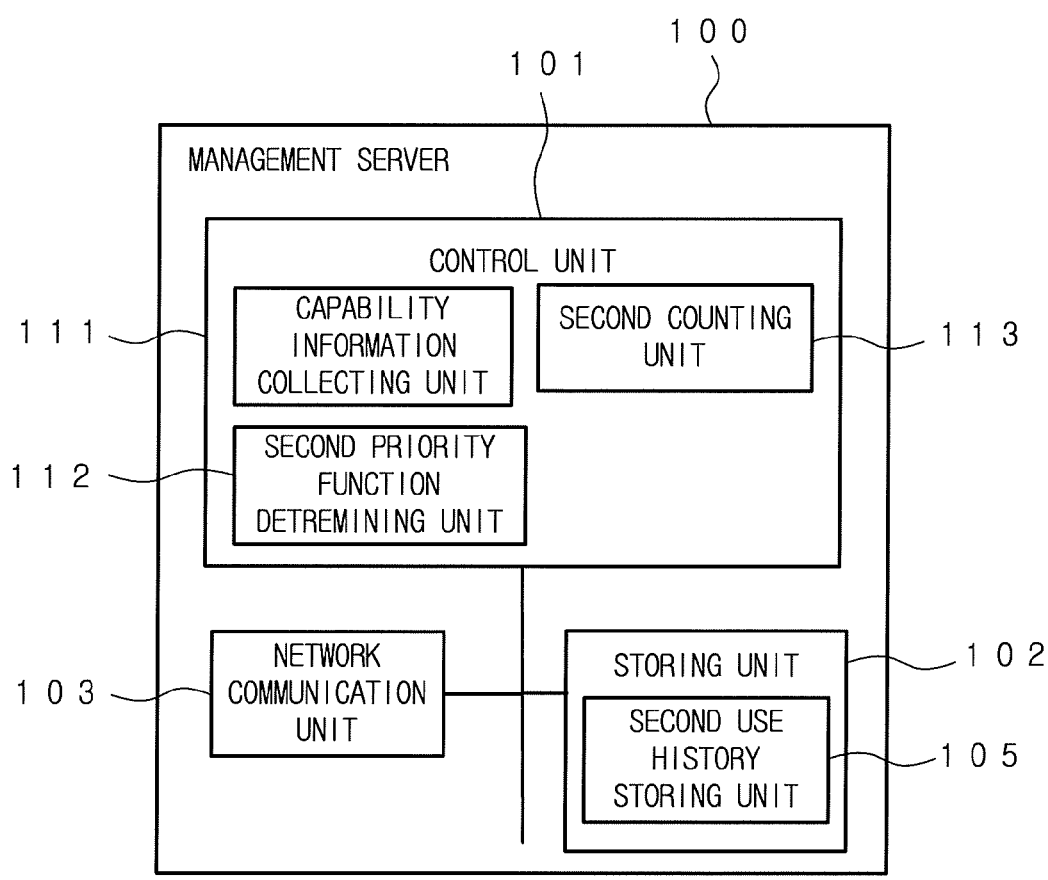
FIG. 18 is a block diagram showing a schematic configuration of the management server according to the second embodiment.

FIG. 18 is a block diagram showing the schematic configuration of the management server 100. The management server 100 comprises a control unit 101, a storing unit 102, a network communication unit 103, and the like.

The control unit 101 comprises a CPU for controlling the operation of the management server 100, and the like. By the CPU of the control unit 101, a middleware, application programs and the like are executed on an OS program as a base.

The storing unit 102 comprises a RAM, a nonvolatile flash ROM, a hard disk drive and the like. In the storing unit 102, various types of programs are stored. By executing various types of processes by the control unit 101 in accordance with these programs, each function of the management server 100 is realized. The storing unit 102 functions as the second use history storing unit 105 for storing the use frequency of each function of the image forming apparatus 10, the number of times the main function and another function are combined and used, and the like, for each image forming apparatus 10.

In detail, the control unit 101 functions as the capability information collecting unit 111, the second priority function determining unit 112, the second counting unit 113, and the like, by executing the programs stored in the storing unit 102.

The capability information collecting unit 111 has the function for obtaining the capability information indicating the functions of the image forming apparatus 10 from a plurality of image forming apparatuses 10 connected to the network 3 to which the management server 100 is connected. In this embodiment, the management server 100 inquires the functions of each image forming apparatus 10 and recognizes the functions of each image forming apparatus 10.

The second priority function determining unit 112 has the function for determining the priority function to be preferentially introduced to a user among the functions of the image forming apparatus 10 for each image forming apparatus 10. In each image forming apparatus 10, an administrator may previously set the priority function, or the management server 100 may dynamically determine the priority function by comparing the functions of one image forming apparatus 10 with the functions of another image forming apparatus 10. The second priority determining unit 112 determines the priority function so as to differentiate the priority function of one image forming apparatus 10 from the priority function of another image forming apparatus 10.

The second counting unit 113 has the function for counting the use frequency of each function for each image forming apparatus 10. The result of the counting is stored in the second use history storing unit 105. In the second use history storing unit 105, the use history in which a plurality of functions are combined and used is also stored for each image forming apparatus 10. For example, the number of times the function "2-sided printing" is selected after the function "staple" is selected is stored as the use history in which the function "staple" and the function "2-sided printing" are combined and used.

The network communication unit 103 has the function for communicating data with each image forming apparatus 10 and the portable terminal 40 via the network 3. The network communication unit 103 functions as the second transmitting unit for transmitting the function introducing information and the like to the portable terminal 40.

Like the image forming apparatus 10 according to the first embodiment, when the management server 100 receives the capability notification request from the portable terminal 40, the management server 100 prepares the function introducing information relating to the image forming apparatus 10 designated in the capability notification request, and transmits the prepared function introducing information to the portable terminal 40 which transmits the capability notification request. The function introducing information has the same format as the function introducing information 50 shown in FIG. 4 or the function introducing information 70 shown in FIG. 14.

The portable terminal 40 which receives the function introducing information from the management server 100 displays the function list 60 or the function list 80 in accordance with the received function introducing information.

The second priority function determining unit 112 determines the priority function of each image forming apparatus 10 in one of the following methods.

(2-1) The priority function is set by an administrator.

(2-2) The priority function is determined by comparing the functions of one image forming apparatus with the functions of another image forming apparatus.

(2-3) The priority function is determined for each image forming apparatus in accordance with the use frequency of each function.

Each of the above methods will be explained.

(2-1) The priority function is set by an administrator.

An administrator previously sets the priority function of each image forming apparatus 10. In case that the same priority function is overlappedly set for a plurality of image forming apparatuses 10, the above overlapped setting is avoided by the warning.

(2-2) The priority function is determined by comparing the functions of one image forming apparatus with the functions of another image forming apparatus.

In this method, the portable terminal 40 obtains the capability information indicating the functions of each image forming apparatus 10 from each image forming apparatus 10 provided on the network 3. Then, the management server 100 compares the obtained capability information, and determines the priority function of each image forming apparatus 10 so as not to overlap the priority function of one image forming apparatus 10 with the priority function of another image forming apparatus 10.

For example, in case that there is a function which the first image forming apparatus 10 has but neither of the other image forming apparatuses 10 has, the above function is determined as the priority function of the first image forming apparatus 10. In case that a plurality of image forming apparatuses 10 have one function, the function is determined as the priority function of one of the above image forming apparatuses 10 so as not to overlap the priority function of one of the image forming apparatuses 10 with the priority function of another image forming apparatus 10.

The range in which the functions of one image forming apparatus 10 are compared with the functions of another image forming apparatuses 10 may be limited to the specific range in which another image forming apparatus 10 has the predetermined relation with one image forming apparatus 10. The predetermined relation includes the following relations (1) to (3) and the like. (1) The manufacturer of one image forming apparatus 10 is the same as that of another image forming apparatus 10. (2) The difference in the IP addresses between one image forming apparatus 10 and another image forming apparatus 10 is within the predetermined range. (3) Another image forming apparatus 10 has the special function which is the same as that of one image forming apparatus 10. Also, in case that the management server 100 is used, a plurality of image forming apparatuses are classified as shown in FIGS. 7 and 8.

Figure 19:
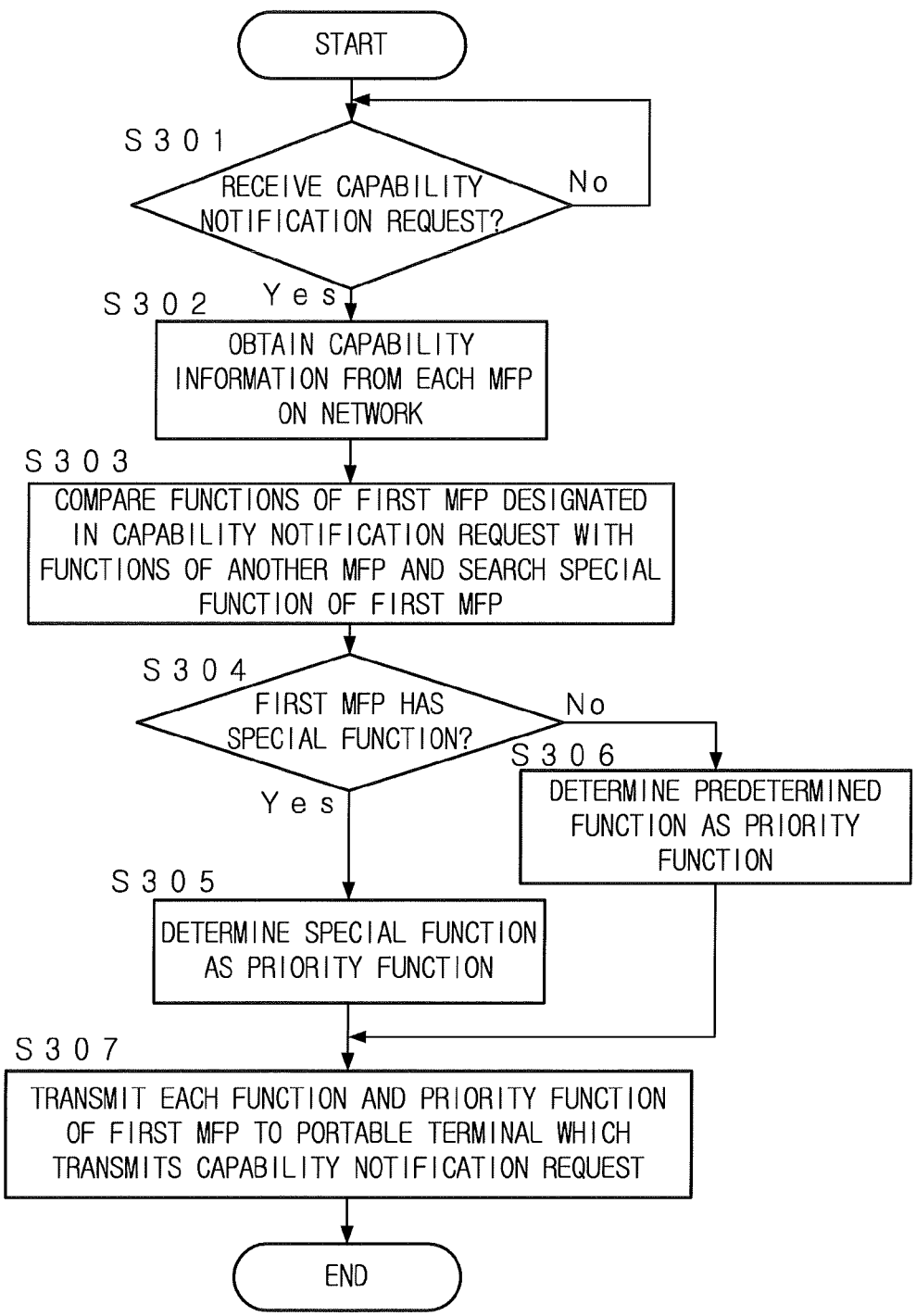
FIG. 19 is a flowchart showing the operation of the management server for determining the priority function by comparing the functions of one image forming apparatus with the functions of another image forming apparatus.

FIG. 19 is a flowchart showing the process executed by the management server 100 in case that the priority function is determined by comparing the functions of one image forming apparatus 10 with the functions of another forming apparatus 10. When the management server 100 receives the capability notification request including the designation of the image forming apparatus 10 from the portable terminal 40 (Step S301; Yes), the management server 100 inquires the functions of each image forming apparatus connected to the network 3 to which the management server 100 is connected, and collects the information indicating the functions of each image forming apparatus 10 (capability information) (Step S302).

The management server 100 compares the functions of the image forming apparatus 10 (referred to as the first MFP) designated in the capability notification request received in Step S301, with the functions of another image forming apparatus 10, and searches the function which the image forming apparatus 10 (the first MFP) designated in the capability notification request has but neither of the other image forming apparatuses 10 has (Step S303).

In case that the image forming apparatus 10 (the first MFP) designated in the capability notification request has the special function (Step S304; Yes), the special function is determined as the priority function of the first MFP (Step S305). Then, the management server 100 prepares the function introducing information indicating each function of the image forming apparatus 10 (the first MFP) designated in the capability notification request and the determined priority function, and transmits the prepared function introducing information to the portable terminal 40 which transmits the capability notification request received in Step S301 (Step S307). The process is ended.

In case that the image forming apparatus 10 (the first MFP) designated in the capability notification request does not have the special function (Step S304; No), the management server 100 determines one of the functions which are overlapped with the functions of another image forming apparatus 10 as the priority function of the first MFP (Step S306) and the process proceeds to Step S307. The management server 100 does not assign the function determined as the priority function of the first MFP to the priority function of another image forming apparatus 10.

As described above, by comparing the functions of one image forming apparatus 10 with the functions of another image forming apparatus 10, the management server 100 determines the priority function of each image forming apparatus 10. Therefore, it is possible to inform a user of the feature of the functions of each image forming apparatus 10 on the network 3.

(2-3) The priority function is determined for each image forming apparatus in accordance with the use frequency of each function.

Figure 20:
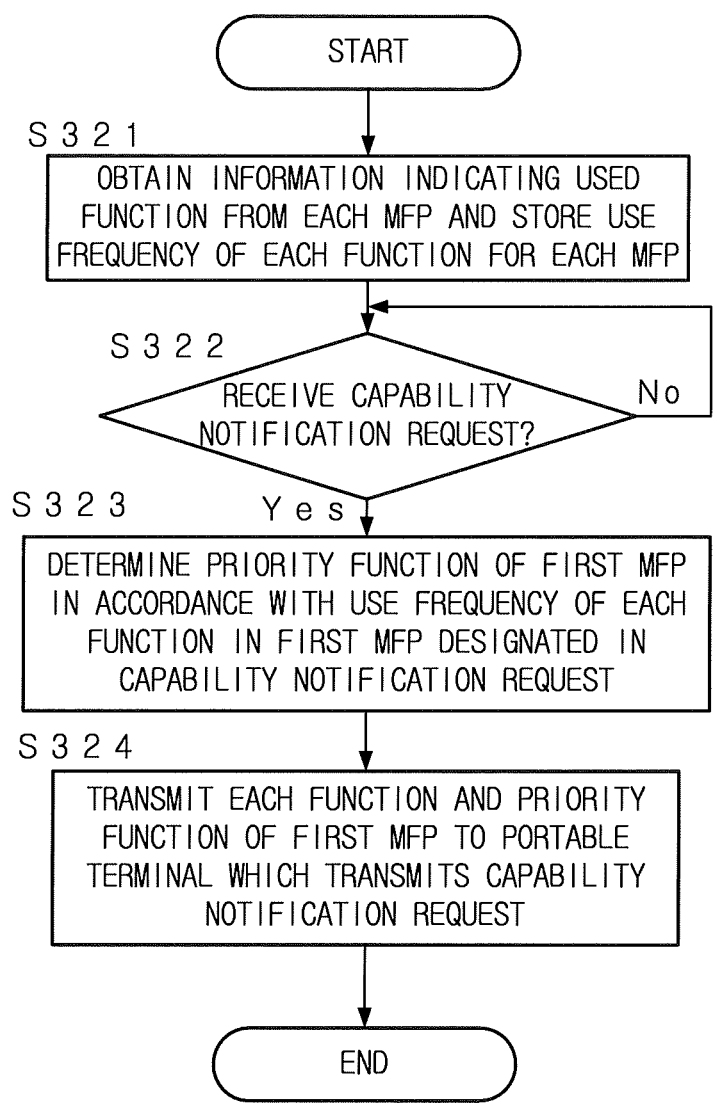
FIG. 20 is a flowchart showing the process for determining the priority function of the image forming apparatus by the management server in accordance with the use frequency of the function.

FIG. 20 shows the process for determining the priority function of the image forming apparatus 10 by the management server 100 in this method. The management server 100 successively receives the notification indicating the used function from each image forming apparatus 10. Then, the management server 100 counts the use frequency of each function for each image forming apparatus 10 (Step S321).

When the management server 100 receives the capability notification request from the portable terminal 40 (Step S322; Yes), the management server 100 determines the function having the lowest use frequency among the functions of the image forming apparatus 10 (referred to as the first MFP) designated in the capability notification request, as the priority function of the above image forming apparatus 10 (Step S323). Then, the management server 100 prepares the function introducing information indicating each function of the image forming apparatus 10 (the first MFP) designated in the capability notification request and the priority function determined in Step S323, and transmits the prepared function introducing information to the portable terminal 40 which transmits the capability notification request (Step S324).

In case that the priority function determined in accordance with the use frequency is overlapped with the priority function of another image forming apparatus 10, the management server 100 adjusts the priority function so as not to set the same function to the priority function in a plurality of image forming apparatuses 10. For example, in case that the function (referred to as the first function) having the lowest use frequency in the first image forming apparatus 10 is the same as the function having the lowest use frequency in the second image forming apparatus 10, the first function is determined as the priority function of the first image forming apparatus 10 and another function is determined as the priority function of the second image forming apparatus 10. For example, the function having the second lowest use frequency among the functions of the second image forming apparatus 10 is determined as the priority function of the second image forming apparatus 10.

Like the case shown in the first embodiment, in case that there are a plurality of functions having the lowest use frequency, the management server 100 determines the function which is randomly selected from the functions having the lowest use frequency, as the priority function.

Next, the case in which the function to be preferentially displayed in accordance with the history in which a plurality of functions are combined and used is changed, will be explained.

The management server 100 successively receives the notification indicating the used function from each image forming apparatus 10, and stores the history in which a plurality of functions are combined and used for each image forming apparatus 10. Then, like the first embodiment, the CPU 101 of the management server 100 prepares the related function information indicating the relation between a plurality of functions combined and used in the image forming apparatus 10 for each image forming apparatus 10. After the CPU 101 of the management server 100 prepares the use history and the related function information for each image forming apparatus 10 like FIG. 12, the management server 100 transmits the function introducing information and the related function information to the portable terminal 40. The process executed by portable terminal 40 is the same as that of the first embodiment.

Like the first embodiment, the management server 100 may attach the priority order to each function of the image forming apparatus 10 for each image forming apparatus and transmit the function introducing information 70 indicating the priority order to the portable terminal 40.

In the second embodiment, the effect which is the same as that of the first embodiment can be obtained.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In these embodiments, the image forming apparatus 10 is explained as a multi function peripheral. However, the image forming apparatus 10 is not limited to the multi function peripheral.

The present invention may be adapted to a program for instructing a server to function as the management server 100.

One of the objects of the above embodiments is to provide an image forming apparatus, a management server, a non-transitory computer-readable recording medium and a terminal device in which a user can easily recognize a special function of the image forming apparatus.

In at least one of the embodiments, when the image forming apparatus notifies the terminal device of the functions of the image forming apparatus, the image forming apparatus determines the priority function to be preferentially introduced to a user and notifies the terminal device of the determined priority function.

In at least one of the embodiments, the image forming apparatus compares the functions of the home apparatus with the functions of another image forming apparatus connected to the network to which the home apparatus is connected, and determines the original function of the home apparatus as the priority function of the home apparatus.

In at least one of the embodiments, the image forming apparatus compares the functions of the home apparatus with the functions of only the image forming apparatus which has the predetermined relation with the home apparatus among the image forming apparatuses connected to the network to which the home apparatus is connected, and determines the priority function of the home apparatus.

In at least one of the embodiments, the image forming apparatus determines the priority function in accordance with the use frequency of each function. For example, the function having the lowest use frequency is determined as the priority function.

In at least one of the embodiments, the image forming apparatus notifies the terminal device of the related function information indicating the relation between a plurality of functions which are combined and used, with the function introducing information.

In at least one of the embodiments, the image forming apparatus assigns the priority order to each function and notifies the terminal device of the priority order of each function. The function having the highest priority order is set to the priority function.

In at least one of the embodiments, the management server determines the priority function of each image forming apparatus on the network, which is preferentially introduced to a user, among a plurality of functions of the image forming apparatus, and notifies the terminal device of the determined priority function and the functions of the image forming apparatus.

In at least one of the embodiments, the management server exclusively determines the priority function of each image forming apparatus so as not to set the same function to the priority function in a plurality of image forming apparatuses.

In at least one of the embodiments, the management server determines the priority function of each image forming apparatus by comparing the functions of one image forming apparatus with the functions of another image forming apparatus.

In at least one of the embodiments, the management server determines the priority function of one image forming apparatus by comparing the functions of one image forming apparatus with the functions of only another image forming apparatus which has the predetermined relation with one image forming apparatus among the image forming apparatuses which are connected to the same network.

In at least one of the embodiments, the management server determines the priority function of each image forming apparatus in accordance with the use frequency of each function in each image forming apparatus. For example, the function having the lowest use frequency in one image forming apparatus is determined as the priority function of one image forming apparatus.

In at least one of the embodiments, the history in which a plurality of functions are combined and used is stored for each image forming apparatus, and the related function information indicating the relation between a plurality of functions is prepared for each image forming apparatus and is transmitted to the terminal device with the function introducing information.

In at least one of the embodiments, the management server assigns the priority order to each function for each image forming apparatus, and transmits the priority order of each function to the terminal device. The function having the highest priority order becomes the priority function.

In at least one of the embodiments, the priority function is displayed in the fixed area, and the other functions (or the functions including the other functions and the priority function) are displayed in the scroll area.

In at least one of the embodiments, in case that the priority function of the first image forming apparatus is the same as the priority function of the second image forming apparatus, the terminal device displays the list of the functions of each image forming apparatus so as to differentiate the priority function of the first image forming apparatus from the priority function of the second image forming apparatus.

According to the image forming apparatus, the management server, the non-transitory computer-readable recording medium and the terminal device, it is possible for a user to easily recognize a special function of the image forming apparatus.

The present U.S. patent application claims the priority of Japanese Patent Application No. 2015-110561, filed on May 29, 2015, according to the Paris Convention, and the entirety of which is incorporated herein by reference for correction of incorrect translation.

What is claimed is:

1. A terminal device which is connected with an image forming apparatus via a network, the terminal device comprising:
    a display unit; and
    a hardware processor configured to receive function introducing information from the image forming apparatus, and to display functions of the image forming apparatus which transmits the function introducing information, on the display unit in accordance with the received function introducing information, so as to preferentially display a priority function, wherein
    in case that a plurality of the image forming apparatuses including a first image forming apparatus and a second image forming apparatus are connected to the network, and the priority function included in the function introducing information relating to the first image forming apparatus is same as the priority function included in the function introducing information relating to the second image forming apparatus, the hardware processor preferentially displays the priority function of the first image forming apparatus when the functions of the first image forming apparatus are displayed, and the hardware processor preferentially displays the function of the second image forming apparatus, which is different from the priority function of the second image forming apparatus, when the functions of the second image forming apparatus are displayed.

2. An image forming system, comprising:
    the terminal device of claim 1; and
    the plurality of image forming apparatuses.

3. A terminal device which is connected with a plurality of image forming apparatuses via a network, the terminal device comprising:
    a display unit; and
    a hardware processor that:
        specifies a priority function of each image forming apparatus, to be preferentially introduced to a user among a plurality of functions of the image forming apparatus, and
        instructs the display unit to display the functions of the image forming apparatus so as to preferentially display the priority function of the image forming apparatus,
    wherein in case that the priority functions are overlapped in at least two of the plurality of image forming apparatuses, the hardware processor differentiates the priority function between the plurality of image forming apparatuses, and
    wherein in case that the priority function included in information relating to the priority function, which is received from a first image forming apparatus included in the plurality of image forming apparatuses is same as the priority function included in information relating to the priority function, which is received from a second image forming apparatus included in the plurality of image forming apparatuses, the hardware processor preferentially displays the priority function of the first image forming apparatus when the functions of the first image forming apparatus are displayed, and the hardware processor preferentially displays the function of the second image forming apparatus, which is different from the priority function of the second image forming apparatus, when the functions of the second image forming apparatus are displayed.

4. The terminal device of claim 3, wherein:
    the hardware processor receives information relating to the functions of each image forming apparatus and information relating to the priority function of each image forming apparatus, to be preferentially introduced to the user among the plurality of functions of the image forming apparatus, from each of the plurality of image forming apparatuses, and
    the hardware processor specifies the priority function of each image forming apparatus in accordance with the received information relating to the priority function, and in case that the priority functions are overlapped in at least two of the plurality of image forming apparatuses, the hardware processor differentiates the priority function between the plurality of image forming apparatuses.

5. An image forming system, comprising:
    the terminal device of claim 3; and
    the plurality of image forming apparatuses.

* * * * *